(12) United States Patent
Martz et al.

(10) Patent No.: US 9,158,584 B2
(45) Date of Patent: Oct. 13, 2015

(54) DISTRIBUTED APPLICATION EXECUTION IN A HETEROGENEOUS PROCESSING SYSTEM

(71) Applicant: RAYTHEON BBN TECHNOLOGIES CORP., Cambridge, MA (US)

(72) Inventors: Robert Martz, Laurel, MD (US); David Matthews, Ellicott City, MD (US); Joshua Edmison, Ellicott City, MD (US)

(73) Assignee: RAYTHEON CYBER PRODUCTS, LLC, Herndon, VA (US)

(*) Notice: Subject to any disclaimer, the term of this patent is extended or adjusted under 35 U.S.C. 154(b) by 255 days.

(21) Appl. No.: 13/856,102

(22) Filed: Apr. 3, 2013

(65) Prior Publication Data

US 2014/0304708 A1 Oct. 9, 2014

(51) Int. Cl.
G06F 9/46 (2006.01)
G06F 9/50 (2006.01)
G06F 9/30 (2006.01)

(52) U.S. Cl.
CPC ... *G06F 9/50* (2013.01); *G06F 9/30* (2013.01)

(58) Field of Classification Search
CPC .............. G06F 8/456; G06F 9/50; G06F 9/30
USPC ................................................. 718/100, 102
See application file for complete search history.

(56) References Cited

U.S. PATENT DOCUMENTS

| | | | | |
|---|---|---|---|---|
| 7,941,791 | B2* | 5/2011 | Wang et al. | 717/140 |
| 8,843,901 | B2* | 9/2014 | Krajec et al. | 717/130 |
| 2005/0188364 | A1* | 8/2005 | Cockx et al. | 717/159 |
| 2012/0260237 | A1* | 10/2012 | Duddles et al. | 717/139 |
| 2013/0283247 | A1* | 10/2013 | Krajec et al. | 717/130 |

OTHER PUBLICATIONS

Sunderam, "PVM: A Framework for Parallel Distributed Computing", Concurrency: practice and experience 2.4 (2006) (pp. 315-339), Department of Math and Computer Science, Emory University, Atlanta, Georgia, provided having pp. 1-27.
Borthakur, "The Hadoop Distributed File System Architecture and Design", The Apache Software Foundation, 2007 (14 pgs.).

(Continued)

*Primary Examiner* — Emerson Puente
*Assistant Examiner* — Willy W Huaracha
(74) *Attorney, Agent, or Firm* — Christie, Parker & Hale, LLP

(57) ABSTRACT

A method for distributing execution of a computer program to a plurality of hardware architectures of different types including: analyzing the computer program to identify a plurality of execution boundaries; selecting one or more execution boundaries from the plurality of execution boundaries; linking the computer program to the selected one or more execution boundaries; executing the computer program with linked execution boundaries; saving a hardware agnostic state of the execution of the computer program, when the execution encounters a boundary from the selected one or more execution boundaries; and transmitting the hardware agnostic state to a remote hardware architecture to be executed on the remote hardware architecture, responsive to the hardware agnostic state.

20 Claims, 5 Drawing Sheets

(56) References Cited

OTHER PUBLICATIONS

Braun, et al., "A Comparison of Eleven Static Heuristics for Mapping a Class of Independent Tasks onto Heterogeneous Distributed Computing Systems", Journal of Parallel and Distributed Computing, Vo. 61, 2001 (pp. 810-837).

Thain, et al., Distributed Computing in Practice: The Condor experience, Computer Sciences Department, University of Wisconsin, Concurrency: Pract. Exper, 2004 (36 pgs.).

* cited by examiner

DISTRIBUTED APPLICATION EXECUTION IN A HETEROGENEOUS PROCESSING SYSTEM

STATEMENT REGARDING FEDERALLY SPONSORED RESEARCH

This invention disclosure is related to a government contract. The U.S. Government has certain rights to this invention.

FIELD OF THE INVENTION

The present invention relates to execution of computer programs and more specifically to a method for distributing application/program execution in a heterogeneous processing system.

BACKGROUND

Due to computationally intensive applications, the need for high-performance computing/processing systems that interact with other computing/processing environments, for example, audio/video systems, control systems, networked applications, image processing, and the like, is ever increasing.

In general, a heterogeneous computing systems refers to a system that uses several different types of computational devices/modules. A computational device could be a general-purpose processor, a special-purpose processor, for example, a digital signal processor or graphics processing unit, a co-processor, or a custom application-specific integrated circuit (ASIC) or field-programmable gate array (FPGA), all of which include processors with different instruction set architectures. Conventionally, programming heterogeneous machines is complicated and time consuming since developing applications that make best use of characteristics of different processors increases the programmer's burden. Conventional methods that require hardware specific code to be included throughout the application code increases the complexity and decreases the portability of software on heterogeneous architectures.

Modern computing systems have many different types of processors, in terms of both power and architecture. In most cases, those processors are not used to their full potential. One of the issues that limits this under-utilization, is that there is no easy way to send portions of an application to be processed on a remote processor while allowing access to the local system resources.

Historically this problem has been solved by packaging isolated sections of data that require processing, and shipping off that data for remote processing. However, this conventional method only works for applications that contain data and processing that are capable of being isolated and do not need to interact with other system resources. An exemplary framework that does this is Hadoop™, which utilizes the Hadoop Distributed File System (HDFS) to distribute data to its compute nodes, and then schedules processing with a JobTracker.

SUMMARY OF THE INVENTION

In some embodiments, the present invention is a method for distributing execution of a computer program to a plurality of hardware architectures of different types. The method includes: analyzing the computer program to identify a plurality of execution boundaries; selecting one or more execution boundaries from the plurality of execution boundaries; linking the computer program to the selected one or more execution boundaries; executing the computer program with linked execution boundaries; saving a hardware agnostic state of the execution of the computer program, when the execution encounters a boundary from the selected one or more execution boundaries; and transmitting the hardware agnostic state to a remote hardware architecture to be executed on the remote hardware architecture, responsive to the hardware agnostic state.

In some embodiments, the present invention is a method for distributing execution of a computer program to a plurality of hardware architectures of different types. The method includes: analyzing the computer program to identify an execution boundaries; linking the computer program to the execution boundary; executing the computer program with the linked execution boundary in an originating hardware architecture; saving a hardware agnostic state of the execution of the computer program, when the execution encounters said execution boundary; and transmitting the hardware agnostic state to a remote hardware architecture to be executed on the remote hardware architecture, responsive to the hardware agnostic state, wherein the remote hardware architecture is selected randomly from a list of remote hardware architectures.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention is directed to a method for distributing application/program execution in a heterogeneous processing system. The invention seamlessly passes a hardware agnostic execution state between a variety of different types of computational devices/modules with their own processors. In other words, the state being passed and the state passing mechanism is not tied to any particular architecture and thus new hardware (processor) types can easily be added and removed from a heterogeneous computing system employing the present invention. The hardware agnostic state is transferred to a target hardware, without making the executing application aware of what portions of the application is executing by which (remote) hardware.

With the present invention, portions of the application can be executed remotely, but share system resources (file system, I/O and user interface) and interact with other program components as if they were running locally. This allows the excess hardware in a computing system to be more effectively and more frequently utilized. Fully utilizing the hardware of a heterogeneous system has benefits in both power and security. Certain types of processing is more power efficient when it takes place on specific hardware, and matching the types of processing to their optimal hardware can have a large impact on the overall power efficiency of the system. From a security standpoint, an attacker needs to know the underlying architecture of a system to crack an attack payload. If the architecture is rapidly and randomly changing, it will be difficult for the attackers to successfully match their payload to the changing architecture.

In some embodiments, a common interface layer, such as an application programming interface (API), is identified in the application to allow the transfer of the state to occur without requiring modification of the application. The present invention allows the state to be transferred and system resources (e.g., remote processing hardware) to be shared among different architectures.

Figure 1:
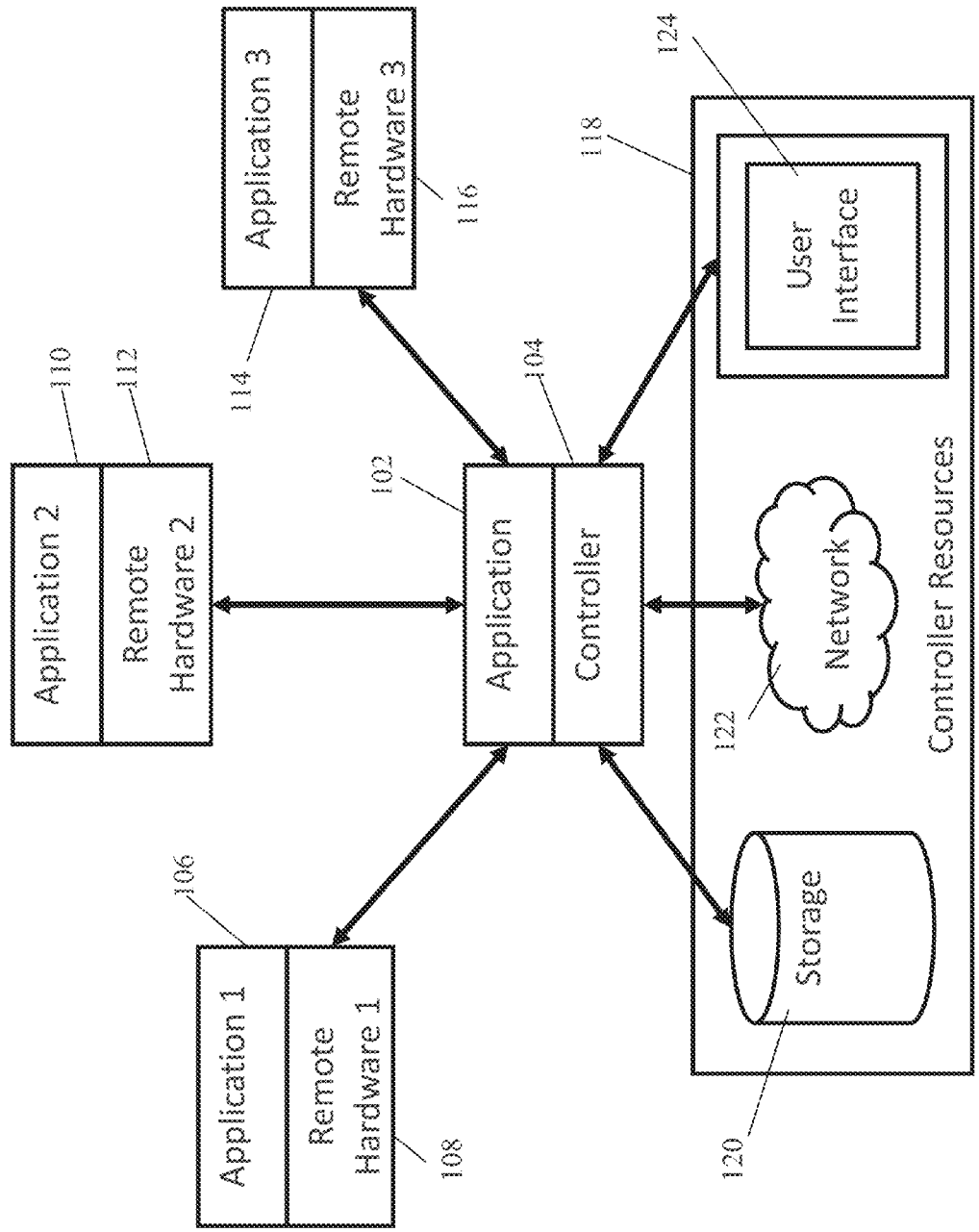
FIG. 1 depicts an exemplary simplified heterogeneous processing environment, according to some embodiments of the present invention.

FIG. 1 depicts an exemplary simplified heterogeneous processing environment, according to some embodiments of the present invention. As shown, an application 102 is being executed on a controller (local hardware) 104 having resources 118, such as a storage medium 120, a communication network 122, a user interface 124, and the like. A first portion of the application 106 may be seamlessly transmitted to a first (remote) hardware 108, a second portion of the application 110 may be seamlessly transmitted to a second (remote) hardware 112, and a third portion of the application 1114 may be seamlessly transmitted to a third (remote) hardware 116 to execution, while a portion of the application is being executed by the (local) hardware 104. Once the execution of the first, second and third portions are each completed by the respective first, second and third (remote) hardwares, the results (and state) of those portions are transferred back to the controller to be integrated back to the application under execution by the controller 104.

Figure 2:
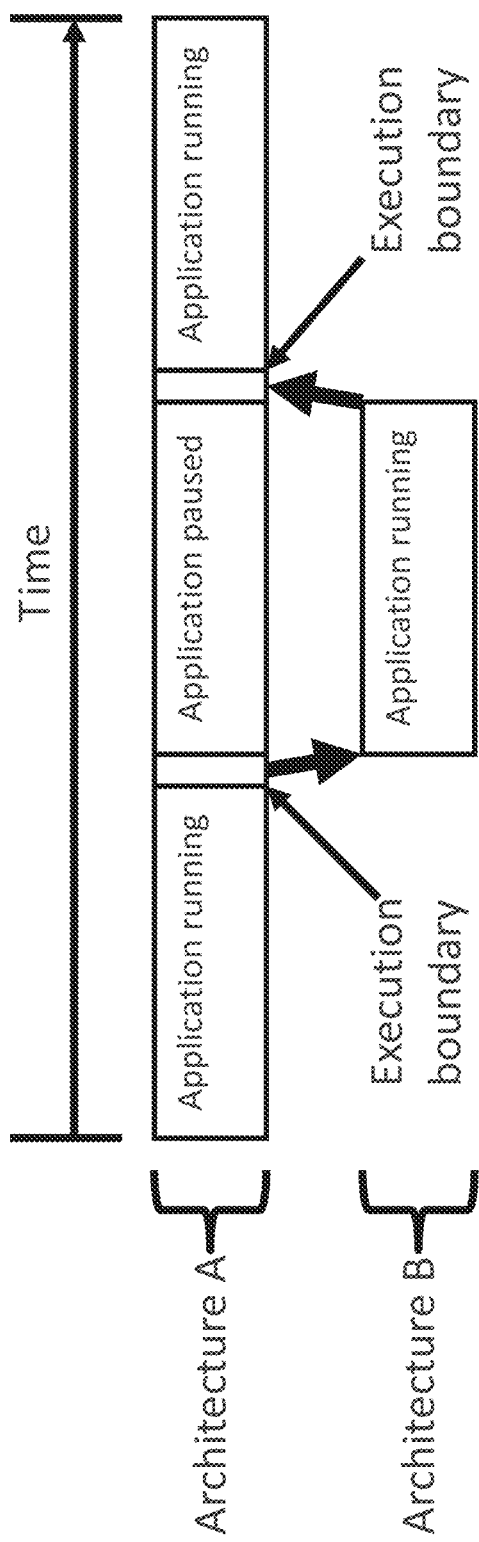
FIG. 2 is a simplified timing diagram of a computer program, according to some embodiments of the present invention.

FIG. 2 is simplified timing diagram of a computer program, according to some embodiments of the present invention. The diagram shown is only a subset of the full timing process, showing only when architecture agnostic state is being transferred from the remote hardware to the controller. Before this would be taking place, the controller would have spawned the application on the remote hardware already. This process first identifies one or more execution boundaries. An execution boundary is the point where execution of the application is stopped on one architecture, the execution state is saved, packaged and sent to another (remote) architecture for execution. In some embodiments, this boundary needs to be a currently utilized application interface, because by choosing an interface already used by application, the application does not have to change to utilize the present invention. Possible examples of this boundary include system calls or Portable Operating System Interface (POSIX).

Once the execution boundary is understood (identified), a method of capturing execution state is identified. This method captures all necessary (execution) information to allow processing to be transferred and restarted on another system, regardless of the underlying architecture of that system.

The method of transfer between processors can be anything that provides a real time transfer capability both to and from the remote hardware, because the originator hardware may be waiting to resume processing until it hears back from the remote hardware. In this case, other applications may be running on the originator hardware at this time, so computing resources are not wasted.

The applications (or sub-applications) that will be running on the remote hardware are also identified, and transferred to their corresponding hardware. That is, identifying which applications are running where, before they are sent to, and started on their respective hardware. This can be done in advance of the execution, or on the fly, allowing the execution assignments to be done at random. The result, is an application-set executing on a distributed set of hardware, but from the applications perspective running on a single system.

Figure 3:
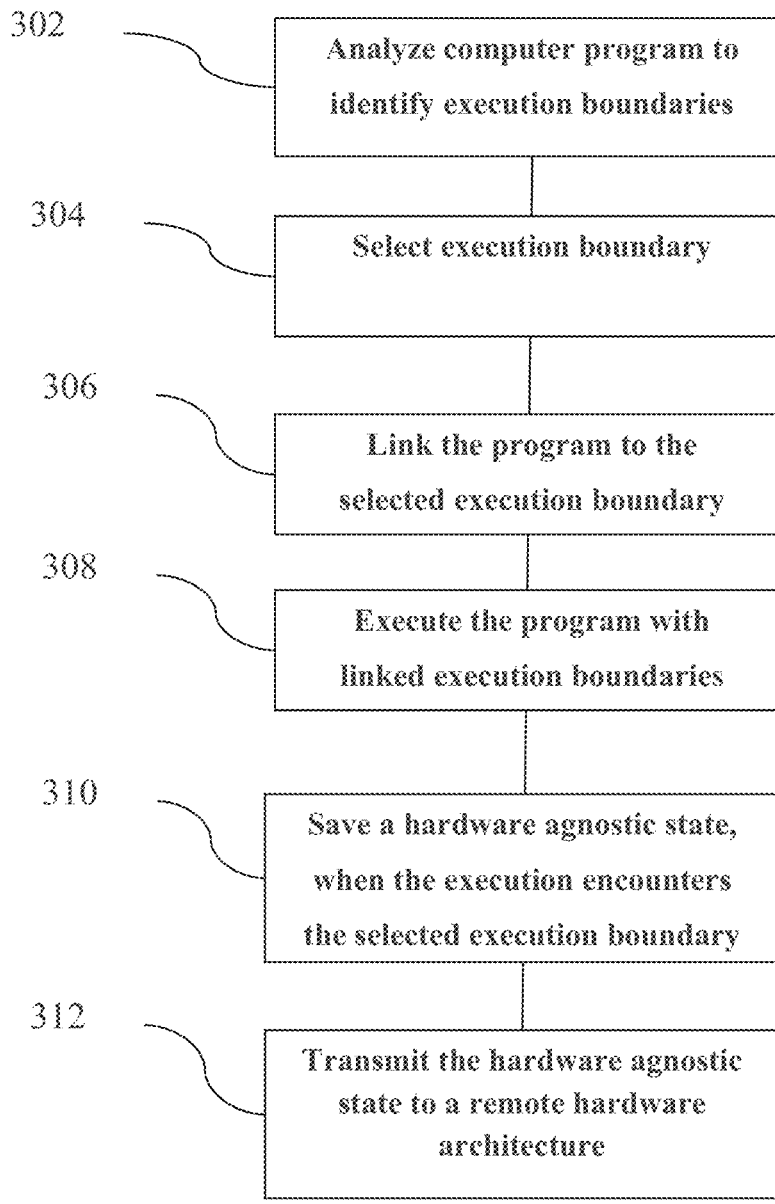
FIG. 3 is an exemplary process flow for distributing execution of a computer program to a plurality of hardware architectures of different types, according to some embodiments of the present invention.

FIG. 3 is an exemplary process flow for distributing execution of a computer program to a plurality of hardware architectures of different types, according to some embodiments of the present invention. As shown in block 302, the computer program/application is analyzed to identify a plurality of execution boundaries within the application. Generally, computer programs that require an operating system to execute have predetermined points where execution control is transferred from the program to the operating system, and point where it is returned to the program. In addition, computer programs often rely on shared libraries in order to not recreate commonly used functionality. That is, there is an execution boundary when a program transfers execution control to the library, and when control is transferred back to the program. The execution boundaries that are identified will vary in how often they are used and how widespread their usage is.

Figure 4:
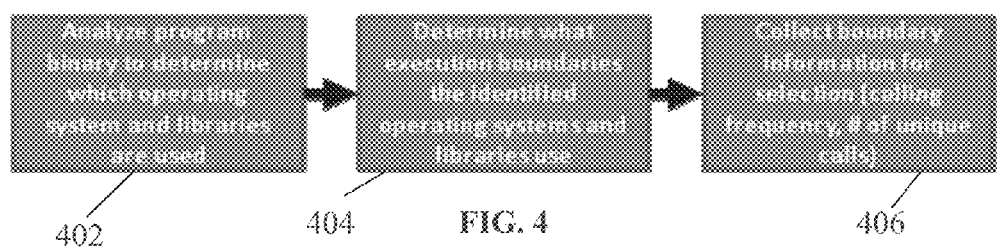
FIG. 4 is a simplified process flow for identifying or selecting a number of execution boundaries in an application, according to some embodiments of the present invention.

FIG. 4 shows a simplified process flow for identifying or selecting a number of execution boundaries in an application, according to some embodiments of the present invention. In block 402, the binary (the binary executable, which is the form the program will exist in on disk right before it is executed, after all build and compilation steps are completed) of the program is analyzed to determine which operating system and libraries are used. Next, in block 404, the invention determines what execution boundaries the identified operating system and libraries utilize, within the application. Boundary information is then collected for selecting one or more execution boundaries within the application. The boundary information may include calling frequency of the boundary, number of unique calls, call timing (when in a program calls are made), calling dependency information (i.e., who makes the call, the application or shared library), and the like.

Referring back to FIG. 3, one or more execution boundaries is (are) selected from the plurality of execution boundaries, in block 304. In some embodiments, the execution boundary is selected based on the design goal of the system. For example, if all execution is destined for the same place, then an execution boundary where there is an execution bottleneck is chosen. Conversely, if execution is to be widely distributed, then an execution boundary that is more spread out is chosen. The boundary could also be selected based on type of application running, for example a network application would require a boundary that provides flexibility with the networking interfaces it provides. Also, a graphical application would require direct access to GPU interfaces. Another example may be data backup applications that need access to storage interfaces.

In block 306, the computer program is linked to the selected one or more execution boundaries. In some embodiments, the linking is accomplished by placing a program in the identified execution boundary, which intercepts all communication. This interceptor program (or a sniffer program)

needs to knows (e.g., based on process ID) which data exchanges to intercept in the selected execution boundary, so the specific program must be identified (usually done by process ID, but there can be other methods). The identification could also be done by user, calling frequency, or a predetermined pattern (every third call is rerouted. The computer program is then executed with linked execution boundaries, in block 308.

In block 310, a hardware agnostic state of the execution of the computer program is saved, when the execution encounters a boundary from the selected one or more execution boundaries. In some embodiments, the interceptor captures the data and control exchanges over the identified boundary and forms a state of the application at the time. The information being exchanged is then organized and packaged in an architecture (hardware) agnostic fashion for transmission to a remote hardware processing unit. This state information (and any data) needs to be operated on by the remote hardware processing unit.

Figure 6:
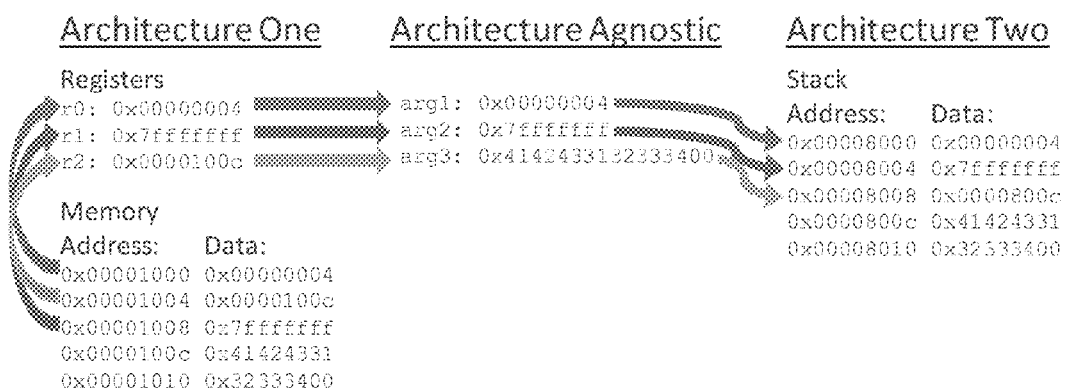
FIG. 6 shows an exemplary state information, according to some embodiments of the present invention.

FIG. 6 shows an exemplary state information, according to some embodiments of the present invention. As shown, the registers of the Architecture one, on which the program is initially being executed are converted to the registers of the "Architecture Agnostic" state and the registers of the "Architecture Agnostic" state are converted to the registers of the "Architecture Two" state. In this example, Architecture One is a register base architecture, and the calling conventions in this case specify that arguments are stored in registers. This data is transferred to the Architecture Agnostic state, which comprises of extracting the arguments form the registers (arg1 and arg2) and packaging data that is specified by any pointers (arg3). This is because the two architectures do not share an address space (pointers cannot be passed between them). The Architecture Agnostic state is transferred to Architecture Two, and translated to its calling conventions. In this example, a stack based calling convention is used, and the arguments are placed onto the stack so execution can continue on this hardware.

On the remote hardware/architectures, execution of the transferred state begins and once the task is completed, the results are returned to the originating hardware. That is, the results are returned to the originating hardware by a reverse process of the transfer. Accordingly, the state will be in the form of the identified interface, and is then translated back into the local calling conventions.

Referring back to FIG. 3, in block 312, the hardware agnostic state is transmitted to a remote hardware architecture to be executed on the remote hardware architecture, responsive to the hardware agnostic state. The destination hardware and the method of transportation are identified, before the agnostic state is transmitted to the remote hardware architecture. In some embodiments, part of the interceptor program role is to send out the state after it is captured, so it is configured with a destination and method of transport. The method of transport is usually fixed, i.e., a network transport between nodes, but it is possible that something like a direct bus transfer or serial connection is made. The destination could be conditional on the type of the call made, or all calls could go to the same destination. In some embodiments, the destination may be randomized, for example, for security purposes so that an attacker wouldn't know where the underlying architecture is and how to access it. That is, the remote hardware architecture is selected randomly from a list of remote hardware architectures.

Figure 5:
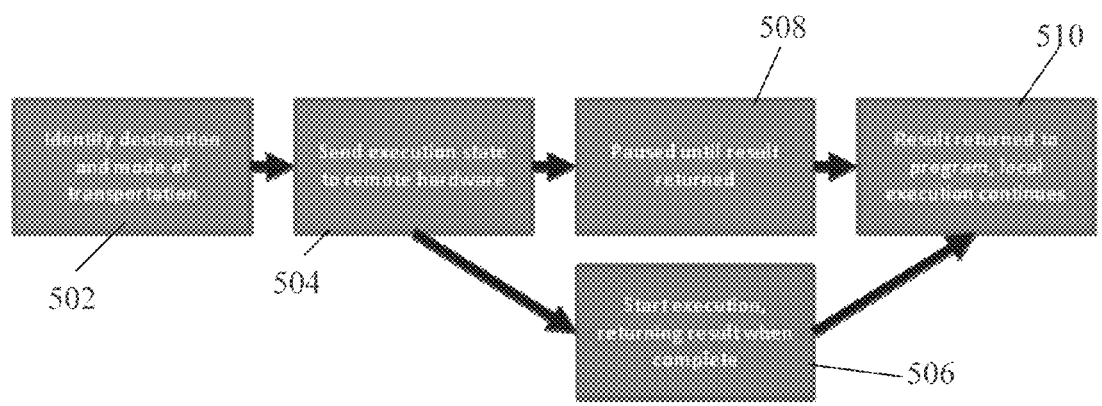
FIG. 5 is a simplified process flow for sending the execution state to a remote hardware and receiving the results back, according to some embodiments of the present invention.

FIG. 5 shows a simplified process flow for sending the execution state to a remote hardware and receiving the results back, according to some embodiments of the present invention. As shown in block 502, the destination (e.g., address of the remote hardware) and mode of transportation (network, local bus connection and the like) are identified by the interceptor program (i.e., already configured in the interceptor program). The (hardware agnostic) state of execution is then transmitted to the destination hardware in block 504. The destination hardware then starts execution of the transferred portion of the application and returns the result to the originating hardware, when completed, in block 506. Meanwhile, the execution of the application is paused in the originating hardware, until the results are received from the remote hardware. However, as explained above, the local hardware may be processing other tasks and/or applications while waiting for the results from the remote hardware.

In some embodiments, the invention groups the selected one or more boundaries for different types of hardware architectures and link the application to the grouping. This way, each portion of the executing application can be optimally assigned and transferred to a corresponding (remote) hardware with minimum execution and/or transmission cost. For example, in some cases, a single interface does not allow an application to perform its task remotely. In these cases, a grouping of interfaces would be needed. An example of this is an application whose range of functions is defined by what data the user enters (for example, a terminal shell) and therefore need to be capable of remotely executing a large number of unrelated actions. This grouping of multiple boundaries allows interception on more than a single execution boundary by multiple interceptors.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for distributing sequential execution of a computer program to a plurality of hardware architectures of different types, the method comprising:

analyzing the computer program to identify a plurality of execution boundaries, wherein there is an execution boundary when the computer program transfers execution control to a library, and when execution control is transferred back to the computer program;

selecting one or more execution boundaries from the plurality of execution boundaries, based on predetermined parameters;

linking the computer program to the selected one or more execution boundaries;

executing the computer program with linked execution boundaries in an originating hardware architecture;

saving a hardware agnostic state of the execution of the computer program at a first execution stop point in the computer program, when the execution encounters a boundary from the selected one or more execution boundaries;

transmitting the hardware agnostic state to a remote hardware architecture to be executed on the remote hardware architecture, responsive to the hardware agnostic state; and sequentially executing the computer program starting from the first execution stop point, by the remote hardware architecture, wherein the computer program is executed by a single hardware architecture at any point of time, during its execution.

2. The method of claim 1, further comprising grouping the selected one or more boundaries for different types of hardware architectures; and linking the computer program to the grouping.

3. The method of claim 2, further comprising saving a plurality of hardware agnostic states of the execution of the computer program responsive to the grouping; and transmitting the plurality of hardware agnostic states to a respective remote hardware architecture, responsive to the grouping.

4. The method of claim 1, wherein analyzing the computer program further comprises determining which operating system and libraries are used by the computer program, determining what execution boundaries the identified operating system and libraries utilize within the computer program; and collecting boundary information for selecting one or more execution boundaries within the computer program.

5. The method of claim 4, wherein the boundary information includes calling frequency of the execution boundary, and number of unique calls to the execution boundary.

6. The method of claim 5, wherein the boundary information further includes call timing and calling dependency information.

7. The method of claim 1, wherein the selected one or more execution boundaries are selected based on how, often they are used and how widespread their usage is.

8. The method of claim 1, wherein the selected one or more execution boundaries are selected based on the type of the computer program.

9. The method of claim 1, further comprising transferring the result of execution of the hardware agnostic state from the remote hardware to the originating hardware architecture.

10. The method of claim 1, further comprising identifying a method of transmitting the hardware agnostic state to the remote hardware architecture.

11. The method of claim 1, wherein the remote hardware architecture is selected randomly from a list of remote hardware architectures.

12. The method of claim 1, wherein registers of the originating hardware architecture are converted to the registers of the hardware agnostic state and registers of the hardware agnostic state are converted to the registers of the remote hardware architecture.

13. A method for distributing execution of a computer program to a plurality of hardware architectures of different types, the method comprising:

analyzing the computer program to identify an execution boundary, wherein there is an execution boundary when the computer program transfers execution control to a library, and when execution control is transferred back to the computer program;

linking the computer program to the execution boundary;

executing the computer program with the linked execution boundary in an originating hardware architecture;

saving a hardware agnostic state of the execution of the computer program at a first execution stop point in the computer program, when the execution encounters said execution boundary;

transmitting the hardware agnostic state to a remote hardware architecture to be executed on the remote hardware architecture, responsive to the hardware agnostic state, wherein the remote hardware architecture is selected randomly from a list of remote hardware architectures; and sequentially executing the computer program starting from the first execution stop point, by the remote hardware architecture, wherein the computer program is executed by a single hardware architecture at any point of time, during its execution.

14. The method of claim 13, wherein the execution boundary includes calling frequency of the execution boundary, and number of unique calls to the execution boundary.

15. The method of claim 14, wherein the execution boundary further includes call timing and calling dependency information.

16. The method of claim 13, wherein the execution boundary is identified based on how often it is used and how widespread its usage is.

17. The method of claim 13, wherein the execution boundaries is identified based on the type of the computer program.

18. The method of claim 13, further comprising transferring the result of execution of the hardware agnostic state from the remote hardware to the originating hardware architecture.

19. The method of claim 13, further comprising identifying a method of transmitting the hardware agnostic state to the remote hardware architecture.

20. The method of claim 13, wherein registers of the originating hardware architecture are converted to the registers of the hardware agnostic state and registers of the hardware agnostic state are converted to the registers of the remote hardware architecture.

* * * * *